(12) United States Patent
Akiyama et al.

(10) Patent No.: US 12,172,685 B2
(45) Date of Patent: Dec. 24, 2024

(54) TRAIN SPEED CONTROL SYSTEM AND TRAIN SPEED CONTROL METHOD

(71) Applicant: Hitachi, Ltd., Tokyo (JP)

(72) Inventors: Tomohiro Akiyama, Tokyo (JP); Ryota Kameyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 17/918,997

(22) PCT Filed: Mar. 31, 2021

(86) PCT No.: PCT/JP2021/013869
§ 371 (c)(1),
(2) Date: Oct. 14, 2022

(87) PCT Pub. No.: WO2021/215212
PCT Pub. Date: Oct. 28, 2021

(65) Prior Publication Data
US 2023/0104180 A1 Apr. 6, 2023

(30) Foreign Application Priority Data
Apr. 20, 2020 (JP) ................... 2020-074837

(51) Int. Cl.
*B61L 23/14* (2006.01)
*G01S 7/40* (2006.01)

(52) U.S. Cl.
CPC .................... *B61L 23/14* (2013.01)

(58) Field of Classification Search
CPC .... B61L 3/00; B61L 3/08; B61L 23/14; B61L 15/40; G01P 3/42; G02S 13/03; G02S 13/60; G02S 7/40
See application file for complete search history.

(56) References Cited

U.S. PATENT DOCUMENTS

2007/0046220 A1* 3/2007 Alton, Jr. ............... B60L 3/102
318/52
2013/0325225 A1* 12/2013 Kane .................... B61L 25/025
701/20
(Continued)

FOREIGN PATENT DOCUMENTS

JP 2001-286009 A 10/2001
JP 2013-213686 A 10/2013
(Continued)

OTHER PUBLICATIONS

International Search Report (PCT/ISA/210) issued in PCT Application No. PCT/JP2021/013869 dated May 11, 2021 with English translation (six (6) pages).
(Continued)

Primary Examiner — Tan Q Nguyen
(74) Attorney, Agent, or Firm — Crowell & Moring LLP

(57) ABSTRACT

A train speed control system 100 includes a first non-contact sensor 110 that outputs measured first speed information, a first safety device 120 that receives the first speed information from the first non-contact sensor 110, a second non-contact sensor 140 that outputs measured second speed information, and a second safety device 150 that receives the second speed information from the second non-contact sensor 140 and transmits the received second speed information to the first safety device 120 at a predetermined timing. Then, when first second speed information is received from the second safety device 150, the first safety device 120 evaluates soundness of the first speed information based on a speed difference between the first second speed information and first first speed information measured by the first non-contact sensor 110 at substantially the same timing as the first second speed information, and determines control speed of a train 1 based on a result of the evaluation.

12 Claims, 4 Drawing Sheets

(56) References Cited

U.S. PATENT DOCUMENTS

2014/0163769 A1\* 6/2014 Otsubo .............. B61L 15/0072
 701/1
2014/0188306 A1\* 7/2014 Kumar ................... B61C 17/12
 701/2

FOREIGN PATENT DOCUMENTS

| JP | 2017-3309 A | | 1/2017 | | |
|---|---|---|---|---|---|
| JP | 2017003309 | \* | 1/2017 | ............. | G01S 13/93 |
| JP | 2017-163623 A | | 9/2017 | | |

OTHER PUBLICATIONS

Japanese-language Written Opinion (PCT/ISA/237) issued in PCT Application No. PCT/JP2021/013869 dated May 5, 2021 (four (4) pages).
Extended European Search Report issued in European Application No. 21793706.9 dated Apr. 15, 2024 (11 pages).

\* cited by examiner

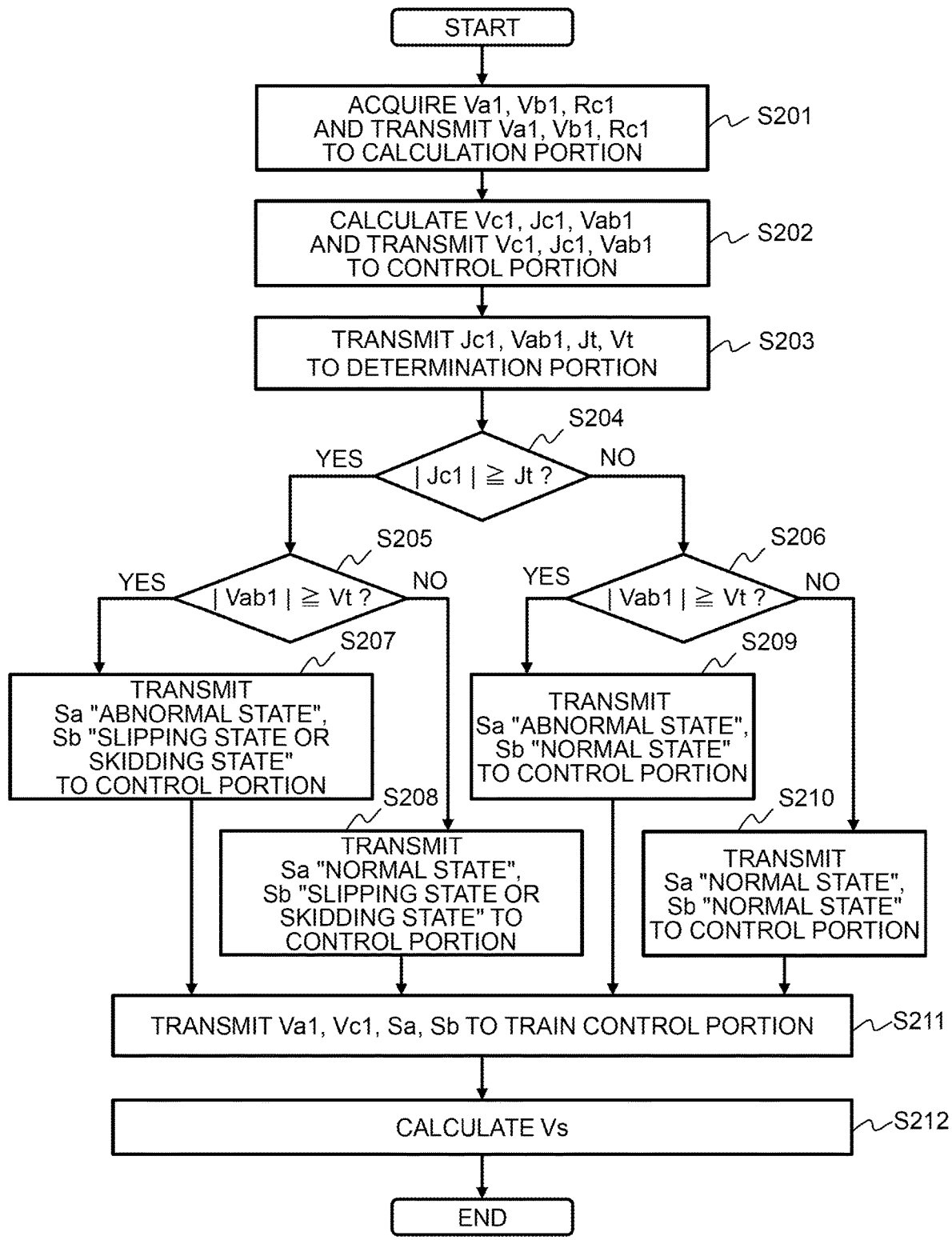

TRAIN SPEED CONTROL SYSTEM AND TRAIN SPEED CONTROL METHOD

TECHNICAL FIELD

The present invention relates to a train speed control system and a train speed control method, and is suitable for application to a train speed control system and a train speed control method for determining control speed of a train in a train on which a non-contact sensor for measuring speed is installed.

BACKGROUND ART

In related art, when measuring moving speed of a moving body, a rotary speed sensor that detects angular velocity using a rotational motion of a wheel, and a non-contact sensor other than a rotary type that does not need to detect rotation of the wheel are generally used. These sensors are also used in a railway technology field to measure train speed. As rotary speed sensors, tacho-generators and pulse generators are widely used, and as non-contact sensors, millimeter wave sensors that detect modulation of reflected waves using light waves are widely used. In addition, each of these sensors has known functional limitations, and in recent years, techniques for using both types of sensors together have been investigated.

For example, JP-A-2017-163623 (PTL 1) discloses a technique that accurately identifies anomalies in speed information of a tacho-generator by comparing the speed information of the tacho-generator as a rotary speed sensor and speed information of a millimeter wave sensor as a non-contact sensor, and applies the speed information of the millimeter wave sensor to control speed of a train when the speed information of the tacho-generator is abnormal.

CITATION LIST

Patent Literature

PTL 1: JP-A-2017-163623

SUMMARY OF INVENTION

Technical Problem

In the related art disclosed in PTL 1, it is described that the speed information from the non-contact sensor (millimeter wave sensor) is used for control when all the wheels of the train equipped with the rotary speed sensors (tacho-generators) are in a slipping state or a skidding state. However, in this case, the speed information by the rotary speed sensor deviates from actual speed, so soundness (validity) of the non-contact sensor cannot be evaluated by comparing the speed information by the rotary speed sensor and the speed information by the non-contact sensor. In other words, in the above case, even when the non-contact sensor transmits erroneous speed information, there is a risk that the speed information of which the soundness is not evaluated is used for the control speed of the train.

The present invention is made in consideration of the above points, and intends to propose a train speed control system and a train speed control method capable of appropriately determining control speed of a train based on a result of evaluating soundness of speed information by a non-contact sensor.

Solution to Problem

In order to solve such a problem, the present invention provides a following train speed control system that determines control speed of a train. The train speed control system includes a first non-contact sensor that outputs first speed information obtained by measuring speed of the train without being affected by rotation of a wheel, a first safety device that is connected to the first non-contact sensor, receives the first speed information from the first non-contact sensor, and holds the received first speed information for at least a predetermined period, a second non-contact sensor that is placed in a car different from the first non-contact sensor and outputs second speed information obtained by measuring the speed of the train without being affected by the rotation of the wheel, and a second safety device that is connected to the second non-contact sensor, receives the second speed information from the second non-contact sensor, and transmits latest first second speed information among the received second speed information to the first safety device at a predetermined timing. Further, in the train speed control system, when the first second speed information is received from the second safety device, the first safety device evaluates soundness of the first speed information based on a speed difference between the first second speed information and first first speed information measured by the first non-contact sensor at substantially the same timing as the first second speed information, and determines the control speed of the train based on a result of the evaluation.

Further, in order to solve such a problem, the present invention provides a following train speed control method by a train speed control system that determines control speed of a train. Here, the train speed control system includes a first non-contact sensor that outputs first speed information obtained by measuring speed of the train without being affected by rotation of a wheel, a first safety device that is connected to the first non-contact sensor, receives the first speed information from the first non-contact sensor, and holds the received first speed information for at least a predetermined period, a second non-contact sensor that is placed in a car different from the first non-contact sensor and outputs second speed information obtained by measuring the speed of the train without being affected by the rotation of the wheel, and a second safety device that is connected to the second non-contact sensor, receives the second speed information from the second non-contact sensor, and transmits latest first second speed information among the received second speed information to the first safety device at a predetermined timing. The train speed control method includes the steps of a) transmitting the first second speed information to the first safety device by using the second safety device, b) evaluating soundness of the first speed information based on a speed difference between the first second speed information received in step a) and first first speed information measured by the first non-contact sensor at substantially the same timing as the first second speed information by using the first safety device, and c) determining the control speed of the train based on an evaluation result of step b).

Advantageous Effects of Invention

According to the present invention, it is possible to appropriately determine the control speed of the train based on the result of evaluating the soundness of the speed information by the non-contact sensor.

BRIEF DESCRIPTION OF DRAWINGS

FIG. 4 is a flowchart illustrating an example of a process procedure of a control speed calculation process in the second embodiment.

DESCRIPTION OF EMBODIMENTS

An embodiment of the present invention will be described in detail below with reference to the drawings.

(1) First Embodiment

A train speed control system 100 according to a first embodiment of the present invention will be described.

Figure 1:
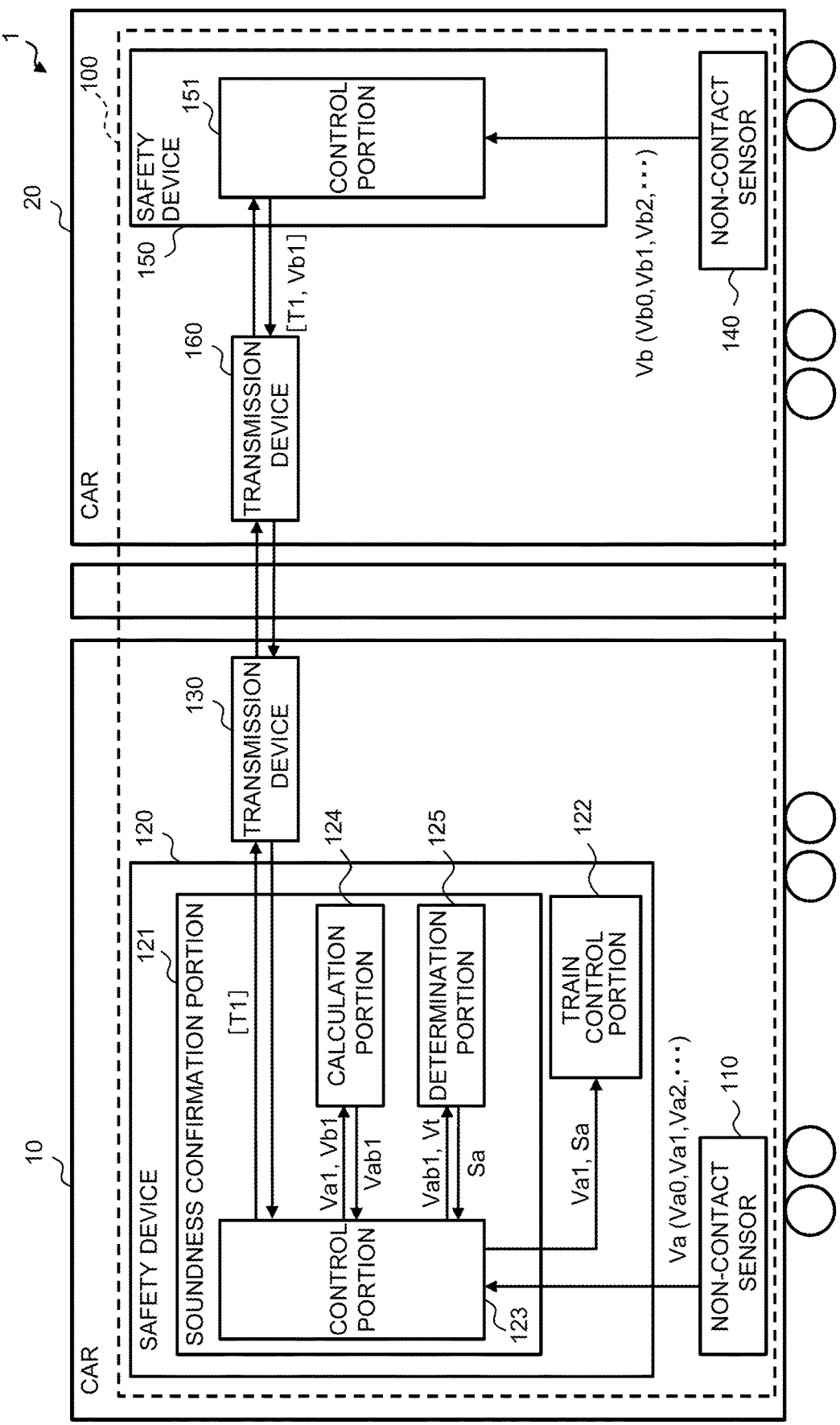
FIG. 1 is a block diagram illustrating a configuration example of a train speed control system 100 according to a first embodiment.

FIG. 1 is a block diagram illustrating a configuration example of the train speed control system 100 according to the first embodiment. In FIG. 1, the movement of information between configurations is represented by solid lines with arrows.

As illustrated in FIG. 1, the train speed control system 100 is a system that controls speed of a train 1 composed of two or more cars including a car 10 and a car 20. The car 10 includes a non-contact sensor 110, a safety device 120, and a transmission device 130 (first configuration block), and the car 20 includes a non-contact sensor 140, a safety device 150, and a transmission device 160 (second configuration block). The present embodiment can be realized even if the transmission device 130 and the transmission device 160 are not provided in the train 1.

FIG. 1 illustrates an example in which the first configuration block is arranged in the car 10 which is the leading car of the train 1 and the second configuration block is arranged in the car 20 which is the last car of the train 1. However, the car where each configuration block is arranged in the train speed control system 100 is not limited to this. The first configuration block may be arranged in any car of the train 1, and the second configuration block may be arranged in the same car as the car where the first configuration block is arranged or any other car.

First, the first configuration block of the train speed control system 100 arranged in the car 10 will be described.

The non-contact sensor 110 is a sensor that measures the speed of the train 1 without being affected by a slipping state or a skidding state of wheels of the train 1. Specifically, for example, the non-contact sensor 110 can use a Doppler radar that calculates speed using the Doppler effect, a speed measurement sensor such as an acceleration sensor, or the like. The non-contact sensor 110 is installed at a position that is not affected by the rotation of the wheels of the train 1, for example, under the floor of the train 1, and periodically transmits speed information Va to the safety device 120 as information representing the measured train speed.

The safety device 120 is a device that includes a soundness confirmation portion 121 and a train control portion 122 and receives the speed information Va of the train from the non-contact sensor 110. At least one safety device 120 is mounted on the train 1 for each train set. The soundness confirmation portion 121 has a function of evaluating the soundness (validity) of the speed information Va by the non-contact sensor 110, and internally has a control portion 123, a calculation portion 124, and a determination portion 125. Each functional portion of the soundness confirmation portion 121, or the entirety thereof, can be implemented in one or more arithmetic devices.

Although details will be described below in the description of a control speed calculation process, in the safety device 120, by determining the soundness (validity) of the speed information Va by the non-contact sensor 110 using speed information Vb by the non-contact sensor 140 and a predefined determination threshold (speed information soundness threshold Vt), the soundness confirmation portion 121 evaluates the soundness (soundness state Sa) of the speed information Va by the non-contact sensor 110. Then, the train control portion 122 calculates control speed Vs of the train 1 based on the soundness evaluation result by the soundness confirmation portion 121, and performs traveling control (detection of traveling position of train 1, determination of output of brake command for train 1, and the like) of the train 1 based on the calculated control speed Vs.

In addition, in FIG. 1, the soundness confirmation portion 121 and the train control portion 122 are illustrated as different devices. However, the present embodiment is not limited to this, and the soundness confirmation portion 121 and the train control portion 122 may be implemented in the same arithmetic device.

The transmission device 130 is a device that is connected to the transmission device 160 of the second configuration block to transmit and receive telegraphic messages. The transmission device 130 is used to transmit information between the safety device 120 of the first configuration block and the safety device 150 of the second configuration block. Moreover, when the transmission device 160 is not provided in the train 1, the transmission device 130 is connected to the safety device 150 of the second configuration block and used to transmit the information between the safety device 120 of the first configuration block and the safety device 150 of the second configuration block.

Next, the second configuration block of the train speed control system 100 arranged in the car 20 will be described. A detailed description of the parts common to the first configuration block will be omitted.

The non-contact sensor 140 is a sensor similar to the non-contact sensor 110. The non-contact sensor 140 is installed at a position that is not affected by the rotation of the wheels of the car 20, for example, under the floor of the train 1, and periodically transmits speed information Vb to the safety device 150 as information representing the measured train speed.

The safety device 150 is a device that includes at least a control portion 151 and receives the speed information Vb of the train from the non-contact sensor 140. At least one safety device 150 is mounted on the train 1 for each train set. The control portion 151 may be implemented in one or more arithmetic devices.

Although details will be described below in the description of a timing adjustment process, in the safety device 150, the control portion 151 receives the speed information Vb from the non-contact sensor 140 and transmits the latest speed information Vb1 of the received speed information Vb to the soundness confirmation portion 121 of the safety device 120.

The transmission device 160 is a device that is connected to the transmission device 130 of the first configuration block to transmit and receive telegraphic messages. The transmission device 160 is used to transmit information between the safety device 120 of the first configuration block and the safety device 150 of the second configuration block. Further, when the transmission device 130 is not provided in the train 1, the transmission device 160 is connected to the safety device 120 of the first configuration block and used to transmit the information between the safety device 120 of the first configuration block and the safety device 150 of the second configuration block. Furthermore, when neither the transmission device 130 nor the transmission device 160 is provided in the train 1, the safety device 120 of the first configuration block and the safety device 150 of the second configuration block are connected to transmit the information.

Figure 2:
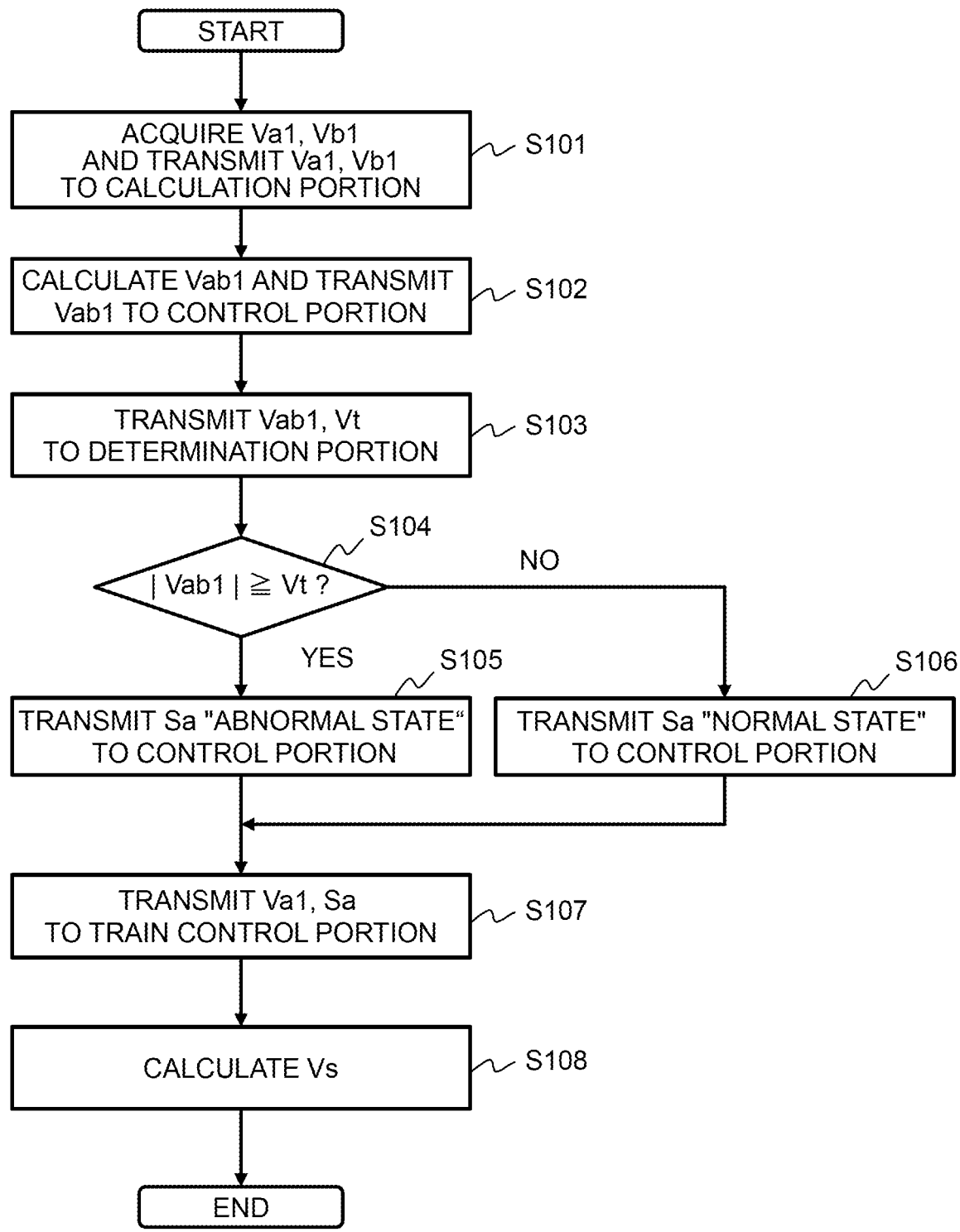
FIG. 2 is a flowchart illustrating an example of a process procedure of a control speed calculation process in the first embodiment.

FIG. 2 is a flowchart illustrating an example of a process procedure of a control speed calculation process in the first embodiment. The control speed calculation process illustrated in FIG. 2 is a process executed by the train speed control system 100. In the control speed calculation process, the soundness confirmation portion 121 evaluates the soundness (soundness state Sa) of the speed information Va measured by the non-contact sensor 110 by comparing the speed information Va with the speed information Vb measured by the non-contact sensor 140 at the same timing as the speed information Va, and the train control portion 122 calculates the control speed Vs of the train 1 based on the speed information Va and the soundness state Sa.

In addition, in the control speed calculation process, in order to accurately evaluate soundness, it is necessary to match the measurement timing of the speed information Va by the non-contact sensor 110 and the speed information Vb by the non-contact sensor 140 to be compared. However, if the car 10, in which the first configuration block is placed, and the car 20, in which the second configuration block is placed, are separated in the train 1, the transmission time between cars becomes long, so there is a possibility that the measurement timing of each piece of speed information is shifted. Therefore, the train speed control system 100 acquires a combination (for example, speed information Va1 and speed information Vb1) of the speed information Va and the speed information Vb measured at the same or substantially the same timing by periodically executing the timing adjustment process described below.

In the timing adjustment process, first, in the safety device 120, the control portion 123 periodically transmits a telegraphic message with a sequence number An (n=1, 2, . . . ) to the transmission device 130. In this description, a telegraphic message transmitted from the control portion 123 to the control portion 151 is called a request telegraphic message. The request telegraphic message transmitted to the transmission device 130 is received by the control portion 151 of the safety device 150 via the transmission devices 130 and 160.

In addition, the control portion 123 periodically receives the speed information Va (individually, speed information Va0, Va1, Va2, . . . ) from the non-contact sensor 110, and stores a history of the speed information Va for a plurality of pieces of speed information Va received at least within a predetermined period in association with the time when the speed information Va is received. In the present embodiment, the "time" information stored in the history of the speed information Va may be replaced with "the time when the speed information Va is measured" instead of "the time when the speed information Va is received".

In the safety device 150, the control portion 151 periodically receives the speed information Vb (individually, speed information Vb0, Vb1, Vb2, . . . ) from the non-contact sensor 140. Also, the control portion 151 periodically receives a request telegraphic message from the control portion 123 from the transmission device 160 and acquires the sequence number An assigned to the request telegraphic message.

The control portion 151 creates a response telegraphic message with the latest sequence number (for example, sequence number A1) acquired from the received request telegraphic message and the latest speed information Vb1 among the speed information Vb received from the non-contact sensor 140, and then the control portion 151 periodically transmits the response telegraphic message to the transmission device 160. The response telegraphic message is received by the control portion 123 of the safety device 120 via the transmission devices 160 and 130.

Next, when receiving a response telegraphic message from the control portion 151 from the transmission device 130, based on the latest sequence number A1 assigned to the received response telegraphic message, the control portion 123 calculates a time T1 when the request telegraphic message with the sequence number A1 is transmitted from the control portion 123.

Next, the control portion 123 calculates, from the difference between a time T2 when the response telegraphic message with the sequence number A1 is received and the time T1 described above, a time T3 required for transmission of the telegraphic messages (request telegraphic message and response telegraphic message) back and forth between the control portion 123 and the control portion 151. Further, the control portion 123 calculates a time T4 by halving the time T3 as the time (that is, transmission time of request telegraphic message or response telegraphic message) required for the one-way transmission of the telegraphic message between the control portion 123 and the control portion 151.

Next, the control portion 123 calculates a time T5 traced back by the time T4 from the time T2. The time T5 can be considered to correspond to the time when the response telegraphic message with the sequence number A1 is transmitted from the control portion 151. Therefore, the control portion 123 determines the speed information Va received at the time T5 as the latest speed information Va1 from the history of the speed information Va held by the control portion 123. When the speed information Va received at exactly the same timing as the time T5 does not exist in the history, the control portion 123 may determine the speed information Va received at the time closest to the time T5 as the latest speed information Va1.

By the above timing adjustment process, the control portion 123 can acquire the combination of the latest speed information Va1 and Vb1 by synchronizing the timing at which each safety device receives the speed information from the non-contact sensor in the car in which the non-contact sensor is installed. Here, the time required from when the speed information Va is measured by the non-contact sensor 110 to when the speed information Va is received by the safety device 120 (control portion 123) of the car 10 and the time required from when the speed information Vb is measured by the non-contact sensor 140 to when the speed information Vb is received by the safety device 150 (control portion 151) of the car 20 can be considered to be the same. Therefore, in other words, through the timing adjustment process, the control portion 123 can acquire the combination of the speed information Va1 and the speed information Vb1 as the latest speed information measured by each non-contact sensor (non-contact sensor 110 and non-contact sensor 140) at the same timing.

In the timing adjustment process described above, the sequence number An is used in order to grasp the correspondence between the request telegraphic message and the response telegraphic message that are periodically transmitted and received. In this case, specifically, for example, each time the request telegraphic message is periodically transmitted from the control portion 123, different sequence numbers An such as A1, A2, . . . are assigned to the request telegraphic message (An may be looped within a predetermined range). When the response telegraphic message is periodically transmitted from the control portion 151 corresponding to each request telegraphic message, the sequence number An (A1, A2, . . . ) of a corresponding request telegraphic message is assigned to the response telegraphic message. However, in the present embodiment, the information assigned to the telegraphic message for the timing adjustment process is not necessarily limited to the above-described sequence number, and information (for example, time information held by each safety device 120 and 150) that can identify the time when each telegraphic message is transmitted may be used.

A process procedure of the control speed calculation process in the first embodiment will be described in detail with reference to FIG. 2. The train speed control system 100 repeatedly executes the processes of steps S101 to S108 illustrated in FIG. 2 at predetermined execution triggers. As the execution trigger, the processes may be executed each time the safety device 120 receives the speed information Va from the non-contact sensor 110, or the processes may be executed each time the safety device 120 receives the speed information Vb by the non-contact sensor 140 from the transmission device 130. Alternatively, the processes may be executed in a predetermined cycle.

According to FIG. 2, first, the control portion 123 transmits the latest speed information Vb1 by the non-contact sensor 140 received from the transmission device 130 and the latest speed information Va1 measured by the non-contact sensor 110 at the same timing as the speed information Vb1 to the calculation portion 124 (step S101). Supplementing step S101, by performing the above-described timing adjustment process in the train speed control system 100, the control portion 123 can acquire a combination of the latest speed information Va1 and the latest speed information Vb1 measured at the same timing.

Next, the calculation portion 124 compares the speed information Va1 and the speed information Vb1 received in step S101 to calculate a speed difference Vab1 therebetween, and transmits the calculated speed difference Vab1 to the control portion 123 (step S102).

Next, the control portion 123 transmits the speed difference Vab1 received in step S102 and the speed information soundness threshold Vt of the non-contact sensor predefined in the control portion 123 to the determination portion 125 (step S103). The speed information soundness threshold Vt is a predefined value for confirming the soundness of whether the speed information Va (Va1 in this example) by the non-contact sensor 110 is a valid value. Specifically, the speed information soundness threshold Vt is represented by, for example, an allowable value of measurement error assumed from the performance of the non-contact sensors 110 and 140.

Next, the determination portion 125 compares an absolute value of the speed difference Vab1 received in step S103 with the speed information soundness threshold Vt, and determines whether the absolute value of the speed difference Vab1 is equal to or greater than the speed information soundness threshold Vt (step S104).

When the absolute value of the speed difference Vab1 is equal to or greater than the speed information soundness threshold Vt in step S104 (YES in step S104), this means that the speed difference Vab1 exceeds a valid range and is abnormal. Thus, the determination portion 125 sets the soundness state Sa of the speed information to the "abnormal state" and transmits the soundness state Sa to the control portion 123 (step S105). On the other hand, when the absolute value of the speed difference Vab1 is less than the speed information soundness threshold Vt in step S104 (NO in step S104), this means that the speed difference Vab1 is within the valid range and is normal. Thus, the determination portion 125 sets the soundness state Sa of the speed information to the "normal state" and transmits the soundness state Sa to the control portion 123 (step S106).

After the process of step S105 or step S106 is executed, the control portion 123 transmits the latest speed information Va1 acquired in step S101 and the soundness state Sa received in step S105 or step S106 to the train control portion 122 (step S107).

Then, the train control portion 122 calculates the control speed Vs of the train 1 based on the speed information Va1 and the soundness state Sa received in step S107 (step S108).

Here, a method for calculating the control speed Vs in step S108 is illustrated.

When the soundness state Sa is the "normal state", the train control portion 122 may, for example, determine the latest speed information Va1 by the non-contact sensor 110 as the control speed Vs of the train 1 as it is. Also, for example, by performing smoothing processing using a plurality of pieces of most recent speed information Va including the speed information Va1 of which the soundness state Sa is determined to be the "normal state", the train control portion 122 may calculate the control speed Vs.

On the other hand, when the soundness state Sa is the "abnormal state", the train control portion 122 does not use the latest speed information Va1 by the non-contact sensor 110 for the control speed Vs of the train 1. In this case, the train control portion 122, for example, acquires the speed information Va (for example, speed information Va0) when the soundness state Sa is finally determined to be the "normal state", and calculates the control speed Vs based on the speed information Va0. Specifically, for example, rising speed assuming that the maximum acceleration expected in the train 1 is applied in the elapsed time from the reception time (measurement time) of the speed information Va0 to the present may be calculated, and a value obtained by adding the rising speed to the speed information Va0 may be calculated as the control speed Vs. Further, when the soundness state Sa is the "abnormal state", the train control portion 122 may calculate the control speed Vs as described above and output an error indicating the content of the abnormality.

In the first embodiment, by executing the control speed calculation process as described above, the train speed control system 100 can appropriately calculate the control speed Vs of the train 1 based on the result of evaluating the validity (soundness) of the speed information Va by the non-contact sensor 110, and the control speed Vs can be used for detecting the traveling position of the train 1, determining the output of the brake command for the train 1, and the like.

(2) Second Embodiment

A train speed control system 200 according to a second embodiment of the present invention will be described. In the following, the second embodiment will be described with a focus on the points that are different from the first embodiment, and the description of the configuration, process, and the like that are common to the first embodiment will be omitted.

Figure 3:
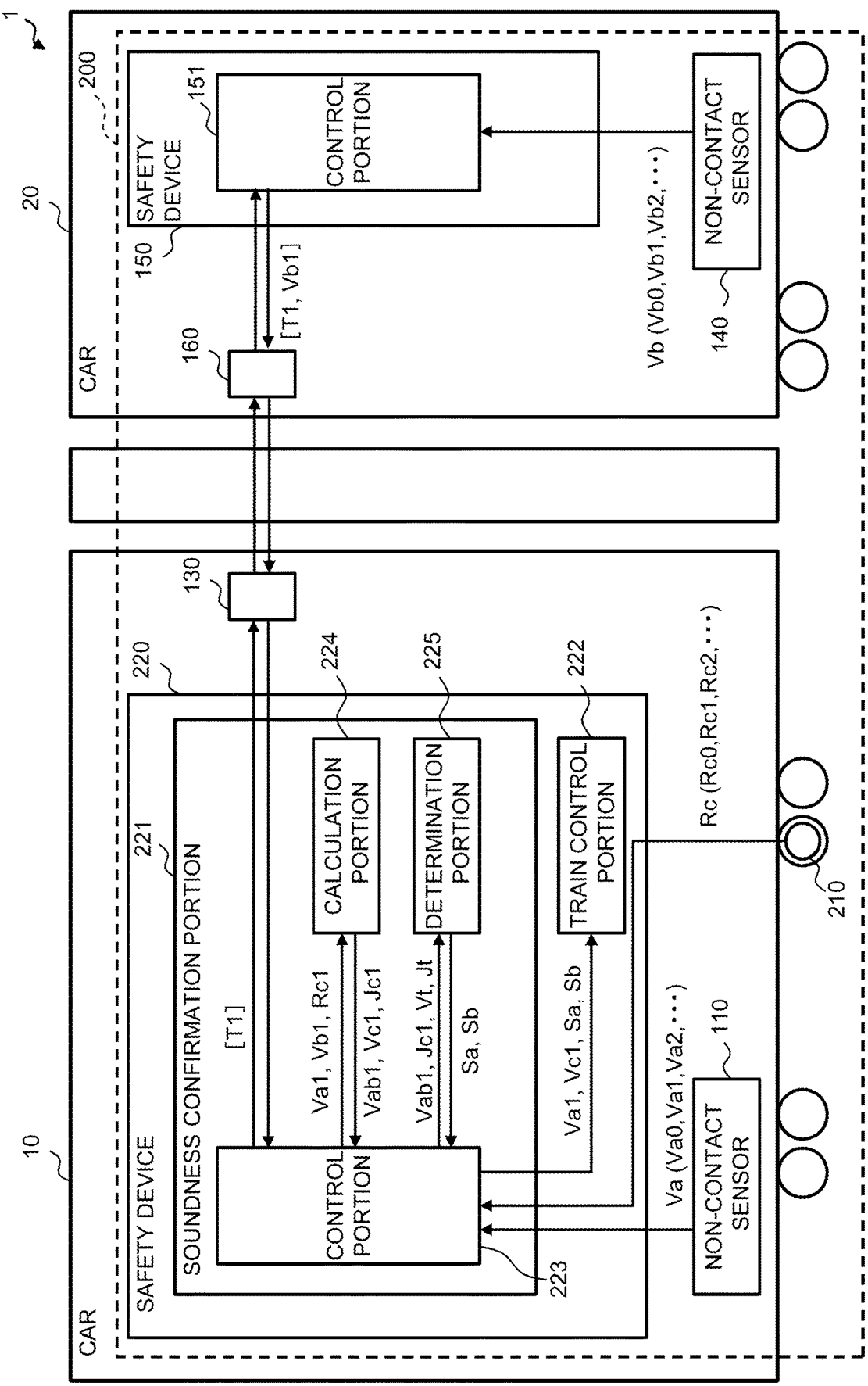
FIG. 3 is a block diagram illustrating a configuration example of a train speed control system 200 according to a second embodiment.

FIG. 3 is a block diagram illustrating a configuration example of the train speed control system 200 according to the second embodiment. In FIG. 3, the movement of information between configurations is represented by solid lines with arrows.

Compared with the train speed control system 100 illustrated in FIG. 1, the train speed control system 200 illustrated in FIG. 3 has a configuration in which a rotary speed sensor 210 is added and the safety device 120 is replaced with a safety device 220 in the first configuration block. The configuration of the second configuration block of the train speed control system 200 is the same as the configuration of the second configuration block of the train speed control system 100.

The rotary speed sensor 210 is a sensor that measures the rotation speed of the wheel of the train 1. As a specific sensor type, any type such as a generator type that converts the rotation of the wheel into voltage, a tacho-generator or a pulse generator that measures the rotation of the wheel using a light ray, or the like may be adopted. The rotary speed sensor 210 is installed at a position where the rotation of the wheel of the train 1 can be measured, and periodically transmits rotation speed information Rc to the safety device 220 as information representing the measured rotation speed of the wheel. When the rotary speed sensor 210 is a pulse generator that outputs the measurement result of the rotation of the wheel as a pulse signal, the rotation speed information Rc may be replaced with the pulse signal, and in this case, the safety device 220 (for example, a control portion 223, which will be described below) has an interface that acquires the pulse signal output from the rotary speed sensor 210.

The safety device 220 is a device that includes a soundness confirmation portion 221 and a train control portion 222. The safety device 220 receives the speed information Va of the train 1 from the non-contact sensor 110 and receives the rotation speed information Rc of the wheel of the train 1 from the rotary speed sensor 210. At least one safety device 220 is mounted on the train 1 for each train set. The soundness confirmation portion 221 has a function of evaluating the soundness (validity) of the speed information Va by the non-contact sensor 110, and internally has functional portions of the control portion 223, a calculation portion 224, and a determination portion 225. Each functional portion of the soundness confirmation portion 221, or the entirety thereof, can be implemented in one or more arithmetic devices.

The control portion 223 periodically receives the speed information Va (individually, speed information Va0, Va1, Va2, . . . ) from the non-contact sensor 110, and stores the history of the speed information Va received at least within a predetermined period in association with the time when the speed information Va is received. In addition, the control portion 223 periodically receives the rotation speed information Rc (individually, rotation speed information Rc0, Rc1, Rc2, . . . ) from the rotary speed sensor 210, and stores a history of the rotation speed information Rc received at least within a predetermined period in association with the time when the rotation speed information Rc is received. In the present embodiment, the "time" information stored in the history of the speed information Va may be replaced with "the time when the speed information Va is measured" instead of "the time when the speed information Va is received", and in this case, the "time" information stored in the history of the rotation speed information Rc is also replaced with "the time when the rotation speed information Rc is measured" instead of "the time when the rotation speed information Rc is received".

Although details will be described below in the description of the control speed calculation process, in the safety device 220, the soundness confirmation portion 221 evaluates the state (soundness state Sa) of the soundness of the speed information Va by the non-contact sensor 110 and the traveling state (traveling state Sb) of the wheel on which the rotary speed sensor 210 is installed, based on the speed information Va periodically received from the non-contact sensor 110, the rotation speed information Rc of the wheel periodically received from the rotary speed sensor 210, the speed information Vb by the non-contact sensor 140 acquired via the transmission devices 130 and 160, and the threshold (speed information soundness threshold Vt for determining the soundness of speed information, slip/skid determination threshold Jt for determining whether the traveling state of the wheel is a slipping state or a skidding state) for determination predefined in itself. Then, the train control portion 222 calculates the control speed Vs of the train 1 based on the information output from the soundness confirmation portion 221, and performs traveling control (detection of traveling position of train 1, determination of output of brake command for train 1, and the like) of the train 1 based on the calculated control speed Vs. In this case, when the soundness confirmation portion 221 evaluates that the soundness state Sa or the traveling state Sb is abnormal, the train control portion 222 uses the speed information evaluated as normal as the control speed Vs, or corrects the speed information (speed Vc) calculated from the rotation speed information Rc by the rotary speed sensor 210 to calculate the control speed Vs (correction speed Vz).

Also, in the train speed control system 200, the timing adjustment process similar to that of the first embodiment is periodically executed. A detailed description of the timing adjustment process is omitted because the description is repetitive. Further, the control portion 223 of the soundness confirmation portion 221 receives not only the speed information Va by the non-contact sensor 110, but also the rotation speed information Rc by the rotary speed sensor 210 installed in the same car 10, and stores the histories of the speed information Va and the rotation speed information Rc. Therefore, by performing the timing adjustment process in the train speed control system 200, the control portion 223 can acquire a combination (for example, speed information Va1, speed information Vb1, and rotation speed information Rc1) of the speed information Va, the speed information Vb, and the rotation speed information Rc measured at the same timing.

Further, the control portion 223 can calculate the speed Vc and acceleration Jc of the train 1 by performing arithmetic processing on the rotation speed information Rc of the wheel received from the rotary speed sensor 210 using the wheel diameter information. Since the speed Vc and the acceleration Jc are calculated based on the rotation speed information Rc measured by the rotary speed sensor 210, the speed Vc and the acceleration Jc may be referred to as "the speed Vc and the acceleration Jc by the rotary speed sensor 210" in the following description.

FIG. 3 illustrates the soundness confirmation portion 221 and the train control portion 222 as different devices. However, the present embodiment is not limited to this, and the soundness confirmation portion 221 and the train control portion 222 may be implemented in the same arithmetic device.

FIG. 4 is a flowchart illustrating an example of a process procedure of a control speed calculation process in the second embodiment. The control speed calculation process illustrated in FIG. 4 is executed by the train speed control system 200. As described above, the train speed control system 200 periodically executes the timing adjustment process as in the first embodiment.

The process procedure of the control speed calculation process in the second embodiment will be described in detail with reference to FIG. 4. The train speed control system 200 repeatedly executes the processes of steps S201 to S212 illustrated in FIG. 4 at predetermined execution triggers. As the execution trigger, the processes may be executed each time the safety device 220 receives the speed information Va from the non-contact sensor 110, or the processes may be executed each time the safety device 220 receives the rotation speed information Rc from the rotary speed sensor 210. Also, as the execution trigger, the processes may be executed each time the safety device 220 receives the speed information Vb by the non-contact sensor 140 from the transmission device 130, or may be executed in a predetermined cycle.

According to FIG. 4, first, the control portion 223 transmits the latest speed information Vb1 by the non-contact sensor 140 received from the transmission device 130, and the latest speed information Va1 by the non-contact sensor 110 and the latest rotation speed information Rc1 by the rotary speed sensor 210 measured at the same timing as the speed information Vb1 to the calculation portion 224 (step S201). Supplementing step S201, by performing the above-described timing adjustment process in the train speed control system 200, the control portion 223 can acquire a combination of the latest speed information Va1, the latest speed information Vb1, and the latest rotation speed information Rc1 measured at the same timing.

Next, the calculation portion 224 calculates the speed Vc1 and acceleration Jc1 by the rotary speed sensor 210 by performing arithmetic processing on the rotation speed information Rc1 received in step S201. Also, the calculation portion 224 compares the speed information Va1 and the speed information Vb1 received in step S201 to calculate a speed difference Vab1 therebetween. The calculation portion 224 then transmits the speed Vc1, the acceleration Jc1, and the speed difference Vab1 calculated above to the control portion 223 (step S202).

Next, the control portion 223 transmits the acceleration Jc1 and the speed difference Vab1 received in step S202, the slip/skid determination threshold Jt of the rotary speed sensor predefined in the control portion 223, and the speed information soundness threshold Vt of the non-contact sensor to the determination portion 225 (step S203). The slip/skid determination threshold Jt is a predefined value for determining whether the traveling state of the wheel on which the rotary speed sensor 210 is installed is the slipping state or the skidding state. The slip/skid determination threshold Jt is set to, for example, a lower limit value of the acceleration change that is assumed when the state of the wheel transitions from the normal traveling state to the slipping state or the skidding state.

Next, the determination portion 225 compares an absolute value of the acceleration Jc1 received in step S203 with the slip/skid determination threshold Jt, and determines whether the absolute value of the acceleration Jc1 is equal to or greater than the slip/skid determination threshold Jt (Step S204). In step S204, when the absolute value of the acceleration Jc1 is equal to or greater than the slip/skid determination threshold Jt (YES in step S204), this means that the wheel on which the rotary speed sensor 210 is installed is not in a normal traveling state but in a slipping state or a skidding state, and the process proceeds to step S205. On the other hand, when the absolute value of the acceleration Jc1 is less than the slip/skid determination threshold Jt in step S204 (NO in step S204), this means that the wheel on which the rotary speed sensor 210 is installed is in a normal traveling state, and the process proceeds to step S206. As described above, the process of step S204 evaluates the traveling state of the wheel on which the rotary speed sensor 210 is installed, in other words, evaluates the soundness of the rotation speed information Rc by the rotary speed sensor 210.

In step S205, the determination portion 225 compares an absolute value of the speed difference Vab1 received in step S203 with the speed information soundness threshold Vt, and determines whether the absolute value of the speed difference Vab1 is equal to or greater than the speed information soundness threshold Vt. When the absolute value of the speed difference Vab1 is equal to or greater than the speed information soundness threshold Vt in step S205 (YES in step S205), this means that the speed difference Vab1 exceeds the valid range and is abnormal, and the process proceeds to step S207. On the other hand, when the absolute value of the speed difference Vab1 is less than the speed information soundness threshold Vt in step S205 (NO in step S205), this means that the speed difference Vab1 is within the valid range and is normal, and the process proceeds to step S208.

In step S206, the determination portion 225 compares the absolute value of the speed difference Vab1 received in step S203 with the speed information soundness threshold Vt, similar to step S205, and determines whether the absolute value of the speed difference Vab1 is equal to or greater than the speed information soundness threshold Vt. When the absolute value of the speed difference Vab1 is equal to or greater than the speed information soundness threshold Vt in step S206 (YES in step S206), the process proceeds to step S209. On the other hand, when the absolute value of the speed difference Vab1 is less than the speed information soundness threshold Vt in step S206 (NO in step S206), the process proceeds to step S210.

By executing the processes of steps S204 to S206, the determination portion 225 can obtain the evaluation results of the wheel slip/skid evaluation (step S204) and the soundness evaluation of the speed information Va1 (steps S205 and S206), and then in steps S207 to S210, the determination portion 225 performs processing in accordance with the combination of the evaluation results. In FIG. 4, the order in which the soundness evaluation of the speed information Va1 is performed after the wheel slip/skid evaluation is performed is illustrated. However, as another example, the execution order of the evaluations may be changed.

In step S207, the determination portion 225 sets the soundness state Sa of the speed information to the "abnormal state" and the traveling state Sb of the wheel to the "slipping state or skidding state", and transmits the soundness state Sa and the traveling state Sb to the control portion 223. In step S208, the determination portion 225 sets the soundness state Sa of the speed information to the "normal state" and the traveling state Sb of the wheel to the "slipping state or skidding state", and transmits the soundness state Sa and the traveling state Sb to the control portion 223. In step S209, the determination portion 225 sets the soundness state Sa of the speed information to the "abnormal state" and the traveling state Sb of the wheel to the "normal state", and transmits the soundness state Sa and the traveling state Sb to the control portion 223. In step S210, the determination portion 225 sets the soundness state Sa of the speed information to the "normal state" and the traveling state Sb of the wheel to the "normal state" and transmits the soundness state Sa and the traveling state Sb to the control portion 223.

After the processes of steps S207 to S210 are executed, the control portion 223 transmits the latest speed information Va1 by the non-contact sensor 110 acquired in step S201, the speed Vc1 by the rotary speed sensor 210 calculated in step S202, and the soundness state Sa and traveling state Sb received in steps S207 to S210 to the train control portion 222 (step S211).

Then, the train control portion 222 calculates the control speed Vs of the train 1 based on the speed information Va1, the speed Vc1, the soundness state Sa, and the traveling state Sb received in step S211 (step S212).

Here, a method for calculating the control speed Vs in step S212 will be illustrated.

In step S212, when the soundness state Sa is the "abnormal state" and the traveling state Sb is the "slipping state or skidding state" (pattern via step S207), it is highly possible that neither the latest speed information Va1 by the non-contact sensor 110 nor the latest speed Vc1 by the rotary speed sensor 210 accurately indicate the current speed of the train 1. In this case, the train control portion 222 does not use the latest speed information Va1 by the non-contact sensor 110 for the control speed Vs of the train 1, but performs a predetermined correction process on the speed Vc (for example, speed Vc0, which will be described below) by the rotary speed sensor 210 to calculate the correction speed Vz, which is determined as the control speed Vs of the train 1. A method of correction processing for calculating the correction speed Vz is not particularly limited, but it is conceivable that, for example, the speed Vc0 when the traveling state Sb is finally determined to be the "normal state" is acquired, and rising speed assuming that the maximum acceleration expected in the train 1 is applied in the elapsed time from the reception time (measurement time) of the speed Vc0 to the present is calculated, and then a value obtained by adding the rising speed to the speed Vc0 is calculated as the correction speed Vz.

Further, in step S212, when the soundness state Sa is the "normal state" and the traveling state Sb is the "slipping state or skidding state" (pattern via step S208), since the traveling state Sb is the "slipping state or skidding state", it is highly possible that the latest speed Vc1 by the rotary speed sensor 210 does not accurately indicate the current speed of the train 1. Therefore, the train control portion 222 determines the latest speed information Va1 by the non-contact sensor 110 as the control speed Vs.

Further, in step S212, when the soundness state Sa is the "abnormal state" and the traveling state Sb is the "normal state" (pattern via step S209), since the traveling state Sa is the "abnormal state", it is highly possible that the latest speed information Va1 by the non-contact sensor 110 does not accurately indicate the current speed of the train 1. Therefore, the train control portion 222 determines the latest speed Vc1 by the rotary speed sensor 210 as the control speed Vs of the train 1.

Further, in step S212, when the soundness state Sa is the "normal state" and the traveling state Sb is the "normal state" (pattern via step S210), the train control portion 222 determines the latest speed Vc1 by the rotary speed sensor 210 as the control speed Vs of the train 1. In this case, since the traveling state Sa is the "normal state", the speed information Va1 by the non-contact sensor 110 is considered to be as reliable as the speed Vc1 by the rotary speed sensor 210. Thus, as another example, the train control portion 222 may determine the latest speed information Va1 by the non-contact sensor 110 as the control speed Vs of the train 1.

In step S212, the train control portion 222 may perform smoothing processing as described in the first embodiment when calculating the control speed Vs as a modification example of the calculation methods described above.

Also, in step S212, when the soundness state Sa is the "abnormal state" or the traveling state Sb is the "slipping state or skidding state", the train control portion 222 may calculate the control speed Vs by the calculation method described above and output an error indicating the content of the abnormality.

In the second embodiment, by executing the control speed calculation process as described above, the train speed control system 200 can appropriately calculate the control speed Vs of the train 1 based on the highly reliable sensor information according to the result of evaluating the validity (soundness) of the speed information Va by the non-contact sensor 110 and the result of evaluating the traveling state of the wheel on which the rotary speed sensor 210 is installed, and the control speed Vs can be used for detecting the traveling position of the train 1, determining the output of the brake command for the train 1, and the like.

In addition, the present invention is not limited to the above-described embodiments, and includes various modification examples. For example, the above-described embodiments are described in detail in order to explain the present invention in an easy-to-understand manner, and are not necessarily limited to those having all the configurations described. Also, part of the configuration of one embodiment can be replaced with the configuration of another embodiment, and the configuration of another embodiment can be added to the configuration of one embodiment. Moreover, it is possible to add, delete, or replace part of the configuration of each embodiment with another configuration.

Further, each of the above-described configurations, functions, processing portions, processing means, and the like may be realized by hardware, for example, by designing a part or all of them using an integrated circuit. Moreover, each of the above-described configurations, functions, and the like may be realized by software by a processor interpreting and executing a program for realizing each function. Information such as programs, tables, and files that realize each function can be stored in recording devices such as memories, hard disks, solid state drives (SSDs), or recording media such as IC cards, SD cards, and DVDs.

Further, in the drawings, control lines and information lines are shown as necessary for explanation, and not all control lines and information lines are necessarily shown on the product. It may be considered that almost all configurations are interconnected in practice.

REFERENCE SIGNS LIST

1: train
10, 20: car
100, 200: train speed control system
110, 140: non-contact sensor
120, 150, 220: safety device 121, 221: soundness confirmation portion
122, 222: train control portion
123, 151, 223: control portion
124, 224: calculation portion
125, 225: determination portion
130, 160: transmission device
210: rotary speed sensor

The invention claimed is:

1. A train speed control system that determines control speed of a train, the train speed control system comprising:
a first non-contact sensor that outputs first speed information obtained by measuring speed of the train without being affected by rotation of a wheel;
a first safety device that is connected to the first non-contact sensor, receives the first speed information from the first non-contact sensor, and holds the received first speed information for at least a predetermined period;
a second non-contact sensor that is placed in a car different from the first non-contact sensor and outputs second speed information obtained by measuring the speed of the train without being affected by the rotation of the wheel; and
a second safety device that is connected to the second non-contact sensor, receives the second speed information from the second non-contact sensor, and transmits latest first second speed information among the received second speed information to the first safety device at a predetermined timing, wherein
when the first second speed information is received from the second safety device,
the first safety device evaluates soundness of the first speed information based on a speed difference between the first second speed information and the first first speed information measured by the first non-contact sensor at substantially the same timing as the first second speed information, and
determines the control speed of the train based on a result of the evaluation,
the first safety device transmits a first telegraphic message to the second safety device,
the second safety device that receives the first telegraphic message transmits a second telegraphic message to which identification information that can be identified as a reply to the first telegraphic message and the first second speed information are added, to the first safety device,
the first safety device that receives the second telegraphic message calculates a communication delay time between the first safety device and the second safety device, based on a time when the first telegraphic message is transmitted and a time when the second telegraphic message is received, and
the first safety device sets the first speed information received from the first non-contact sensor at a timing preceding the communication delay time from the time when the second telegraphic message is received, as the first first speed information.

2. The train speed control system according to claim 1, wherein
when the speed difference is less than a predetermined value, the first safety device evaluates the soundness of the first speed information as a normal state and determines the control speed using the first first speed information, and
when the speed difference is equal to or greater than the predetermined value, the first safety device evaluates the soundness of the first speed information as an abnormal state and determines the control speed without using the first first speed information.

3. The train speed control system according to claim 2, wherein
when the speed difference is equal to or greater than the predetermined value, the first safety device determines the control speed using the second first speed information that most recently evaluates the soundness as a normal state.

4. The train speed control system according to claim 2, wherein
the first safety device outputs a predetermined error when the soundness of the first speed information is evaluated as an abnormal state.

5. The train speed control system according to claim 1, further comprising:
a rotary speed sensor that is arranged in the same car as the first non-contact sensor and outputs rotation speed information obtained by measuring rotation speed of the wheel, wherein
the first safety device receives the rotation speed information from the rotary speed sensor and holds the received rotation speed information for at least a predetermined period, and
when the first second speed information is received from the second safety device,
the first safety device evaluates a traveling state of the wheel of the car in which the rotary speed sensor is arranged based on acceleration of the train that can be calculated from the first rotation speed information measured by the rotary speed sensor at substantially the same timing as the first second speed information, and
determines the control speed of the train based on an evaluation result of the soundness of the first speed information and an evaluation result of the traveling state of the wheel.

6. The train speed control system according to claim 5, wherein
the first safety device transmits a first telegraphic message to the second safety device,
the second safety device that receives the first telegraphic message transmits a second telegraphic message to which identification information that can be identified as a reply to the first telegraphic message and the first second speed information are added, to the first safety device,
the first safety device that receives the second telegraphic message calculates a communication delay time between the first safety device and the second safety device, based on a time when the first telegraphic message is transmitted and a time when the second telegraphic message is received, and
the first safety device sets the first speed information received from the first non-contact sensor at a timing preceding the communication delay time from the time when the second telegraphic message is received, as the first first speed information, and sets the rotation speed information received from the rotary speed sensor at a timing preceding the communication delay time from the time when the second telegraphic message is received, as the first rotation speed information.

7. The train speed control system according to claim 5, wherein
when the acceleration of the train is less than a predetermined value, the first safety device evaluates the traveling state of the wheel as a normal state, and determines the control speed using the speed of the train that can be calculated from the first first speed information or the first rotation speed information, and when the acceleration of the train is equal to or greater than the predetermined value, the first safety device evaluates the traveling state of the wheel as a slipping state or a skidding state, and determines the control speed without using the speed of the train that can be calculated from the first rotation speed information.

8. The train speed control system according to claim 5, wherein the first safety device evaluates the soundness of the first speed information as an abnormal state, and when the traveling state of the wheel is evaluated as a normal state, the first safety device determines the control speed using the speed of the train that can be calculated from the first rotation speed information.

9. The train speed control system according to claim 5, wherein the first safety device evaluates the soundness of the first speed information as an abnormal state, and when the traveling state of the wheel is evaluated as a slipping state or a skidding state, the first safety device determines the control speed using the speed of the train that can be calculated from the second rotation speed information that most recently evaluates the traveling state of the wheel as a normal state.

10. The train speed control system according to claim 5, wherein the first safety device outputs a predetermined error when the traveling state of the wheel is evaluated as a slipping state or a skidding state.

11. A train speed control method by a train speed control system that determines control speed of a train, wherein the train speed control system includes, a first non-contact sensor that outputs first speed information obtained by measuring speed of the train without being affected by rotation of a wheel, a first safety device that is connected to the first non-contact sensor, receives the first speed information from the first non-contact sensor, and holds the received first speed information for at least a predetermined period, a second non-contact sensor that is placed in a car different from the first non-contact sensor and outputs second speed information obtained by measuring the speed of the train without being affected by the rotation of the wheel, and a second safety device that is connected to the second non-contact sensor, receives the second speed information from the second non-contact sensor, and transmits the latest first second speed information among the received second speed information to the first safety device at a predetermined timing, and the train speed control method includes the steps of, a) transmitting the first second speed information to the first safety device by using the second safety device, b) evaluating soundness of the first speed information based on a speed difference between the first second speed information received in step a) and the first first speed information measured by the first non-contact sensor at substantially the same timing as the first second speed information by using the first safety device, and c) determining the control speed of the train based on an evaluation result of step b), wherein the first safety device transmits a first telegraphic message to the second safety device, the second safety device that receives the first telegraphic message transmits a second telegraphic message to which identification information that can be identified as a reply to the first telegraphic message and the first second speed information are added, to the first safety device, the first safety device that receives the second telegraphic message calculates a communication delay time between the first safety device and the second safety device, based on a time when the first telegraphic message is transmitted and a time when the second telegraphic message is received, and the first safety device sets the first speed information received from the first non-contact sensor at a timing preceding the communication delay time from the time when the second telegraphic message is received, as the first first speed information used in step b).

12. The train speed control method according to claim 11, wherein the train speed control system further includes a rotary speed sensor that is arranged in the same car as the first non-contact sensor and outputs rotation speed information obtained by measuring rotation speed of the wheel, the first safety device receives the rotation speed information from the rotary speed sensor and holds the received rotation speed information for at least a predetermined period, the train speed control method further includes the step of d) evaluating a traveling state of the wheel of the car in which the rotary speed sensor is arranged based on acceleration of the train that can be calculated from the first rotation speed information measured by the rotary speed sensor at substantially the same timing as the first second speed information received in step a) by using the first safety device after step a), and in step c), the first safety device determines the control speed of the train based on an evaluation result of step b) and an evaluation result of step d).

* * * * *